May 31, 1955  R. M. BAKER  2,709,740

INDUCTION HEATING APPARATUS

Filed Jan. 22, 1952

WITNESSES:

John E. Heasley

Leon M. Garman

INVENTOR
Robert M. Baker

BY
F. E. Browder
ATTORNEY

United States Patent Office 2,709,740
Patented May 31, 1955

2,709,740

INDUCTION HEATING APPARATUS

Robert M. Baker, Linthicum Heights, Md., assignor to Westinghouse Electric Corporation, East Pittsburgh, Pa., a corporation of Pennsylvania Application January 22, 1952, Serial No. 267,677

13 Claims. (Cl. 219—10.77)

My invention relates to induction heating and in particular relates to a method of regulating the electrical constants to maintain highly efficient operation despite variations in reactance of an alternating current heating load. My invention is illustrated herein as applied to an alternator of frequency of about 10,000 cycles per second which inductively heats a continuous strip of steel which moves through an inductor coil and which may vary in dimensions from time to time, thereby varying the reactance of the load presented to the source supplying power.

A dynamoelectric generator can supply current effectively at the above-mentioned frequency only to a circuit of power-factor which is substantially 100 percent. On the other hand, the heating member comprises a helix of copper pipe, often of many turns, through the center of which the strip of steel is to be heated runs, and is likely to have a power-factor as low as five percent. This low power factor may be corrected by connecting capacitance of the right value in shunt with the helix, thereby presenting a net load of unity power factor to the generator; but this requires that the size of the capacitance shall be varied if, at any time, the reactance of the helix changes. In practice, it is often desirable to change the strip being heated from one size to another without interrupting operation of the heating member, and this may be done by quickly welding, to the rear end of a strip just about to pass through the heater, the front end of another strip of different size. When this change is made the reactance at the terminals of the heater helix undergoes an abrupt change, which calls for a change in the capacitance to maintain unity power factor at the generator terminals. The required change of capacitance is so great, however, that it cannot be made by simple knife-switches or the like, because such would be rapidly received, but would require expensive and complicated arc-quenching contactors.

One object of my invention is accordingly to provide an arrangement by which the power factor at the generator terminals in such a system as I have just described may be maintained at a satisfactory value, despite changes in strip size or the magnetizing force used for heating, without the necessity of switching capacitance into or out of the circuit.

Another object is to provide an arrangement by which the power factor of a load-circuit supplied from an alternating current source may be varied at will without the necessity of switching reactors in and out of the circuit.

Another object is to provide an improved system for heating from an alternating current source loads of a type which tend to vary in reactance from time to time.

Still another object is to provide an improved induction heating system for loads which are liable to sudden changes of cross-section or magnetic properties.

Other objects of my invention will become apparent upon reading the following description taken in connection with the drawings in which.

Figure 1:
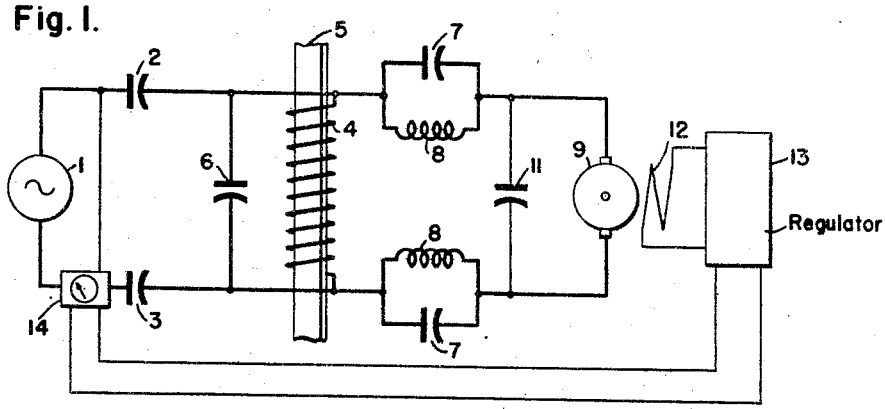
Figure 1 is a schematic showing of one inductor-heater arrangement embodying the principles of my invention.

Referring in detail to Fig. 1 a source of alternating current which may be a 10,000 cycle-per-second inductor alternator is connected through a pair of blocking capacitors 2, 3 to the helix 4, which may be of copper pipe, of a heating unit for heating strip steel. The strip steel 5 is pulled by suitable work handling apparatus, such as reels (not shown), through the center of the helix member 4. The alternating current flowing from source 1 through the latter member 4, induces currents in the steel strip 5 which heat it to a degree that may be regulated in ways well known in the induction heating art; for example, by varying the output-voltage of source 1. Since the helix member 4 draws a heavily lagging current from the line, capacitance 6 is shunted across the terminals of the helix 4 in an amount sufficient so that, except for the additional elements just about to be described, a slightly lagging current would be drawn from the terminals of source 1.

The two terminals of helix 4 are connected through a pair of anti-resonant circuits each comprising a capacitor 7 and an inductor 8, to the respective terminals of a direct current source which may comprise a dynamoelectric generator 9. The anti-resonant circuits are tuned to resonate at the frequency of the source 1, thereby insuring that alternating current from the latter source 1 will be blocked out of generator 9; but to give double protection against the last-mentioned contingency the terminals of source 9 may be shunted with a by-pass capacitance 11. The generator 9 has a field winding 12 and regulating means 13 therefor.

A power-factor response device 14, of any suitable type among those known in the art for producing an output voltage proportional, in magnitude and algebraic sign, to departures from unity power-factor at the terminals of source 1, is connected to regulator 13 to increase the voltage of generator 9 when the power-factor at source 1 is a leading one and to decrease the voltage of generator 9 when said power-factor is a lagging one. Power factor device 14 is connected in series with generator 1 and is connected to measure the potential across generator 1, since it is the terminal power factor of this generator which we wish to maintain constant.

The mode of operation of the Fig. 1 arrangement is as follows. When source 9 sends direct current through inductors 8 and helix 4, its magnetizing effect in the latter varies the degree of magnetic saturation of strip 5, and, since it constitutes a magnetic core for helix 4, this varies the reactance of the latter. With any given strip passing through helix 4, the voltage at generator 9 is adjusted to change the magnetic permeability of strip 5 to such a value that the power-factor meter shows the power-factor at the terminals of source 1 to be unity when regulator 13 is in the need-region of its adjusting range.

Now if the power-factor at the terminals of source 1 changes for any reason, as for example, because a change in size of the strip 5 reduces the reactance of helix 4, the power-factor response device 14 will act through voltage-regulator 13 to reduce the voltage and direct current impressed by generator 9 on helix 4 to decrease the magnetic saturation in strip 5 and thereby raise its reactance until the power-factor at the terminals of source 1 is again unity.

Figure 2:
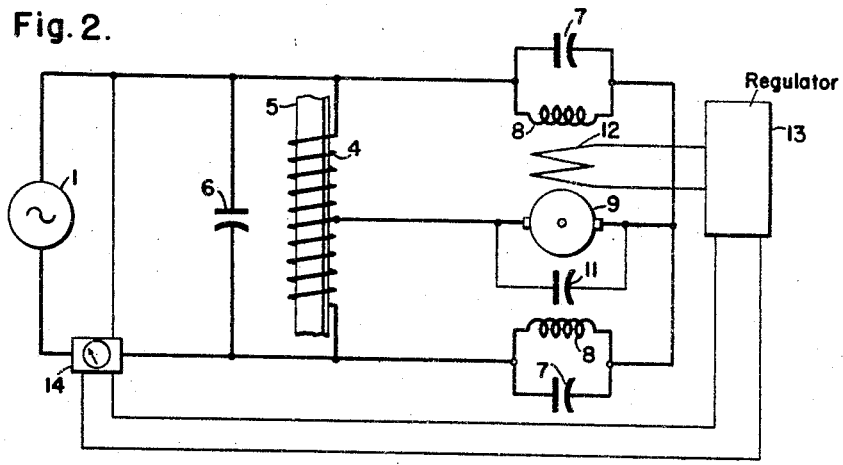
Fig. 2 is a similar showing of a different species of my invention.

Fig. 2 shows an alternative arrangement in which the direct-current generator 9 has one terminal connected to the midpoint of the helix 4 while the other terminal of generator 9 is connected to both end terminals of helix 4. The remaining components of the arrangement are generally the same as in Fig. 1, except that the blocking capacitors 2 and 3 of Fig. 1 may be omitted. The reference numerals used in Fig. 1 are applied to corresponding components in Fig. 2, and it is accordingly believed that the structure in Fig. 2 needs no further description.

The direct current from generator 9 magnetizes portions of steel strip 5 which may be in the upper and lower halves of helix 4 in opposite directions with substantially equal intensities, thereby producing a symmetry that produces the same effect on the successive half-waves of the alternating current flowing from source 1 through helix 4. Distortion of the wave-form of the alternating current is thereby minimized. The operation of the power-factor response device 14 and voltage regulator 13 in maintaining unity power-factor is generally the same in Fig. 2 as in Fig. 1.

Figure 3:
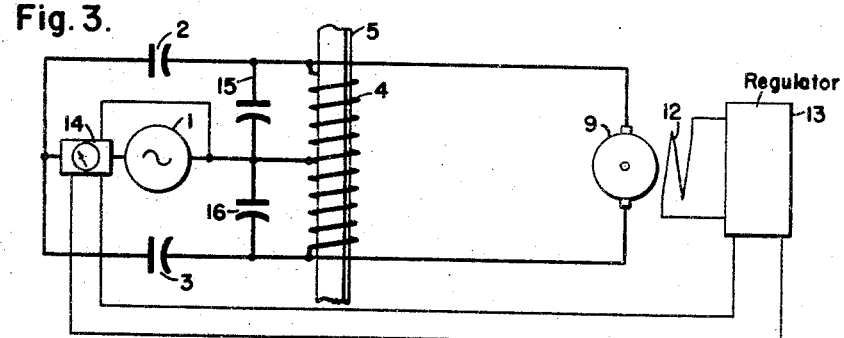
Fig. 3 is a similar showing of still another species of my invention.

Fig. 3 shows a modification of my invention which I consider preferable for most purposes. In it one terminal of alternator 1 is connected to the midpoint of helix 4. The direct-current generator 9 is connected across the helix 4. A pair of similar capacitors 15 and 16 are also connected from the common terminal of alternator 1 and the midpoint of helix 4 to the respective end-terminals of helix 4.

Since the end-terminals of helix 4 are both connected to the same terminal of alternator 1 through the equal impedances of capacitors 2 and 3, there will be substantially no alternating voltage impressed across the terminals of direct-current generator 9; hence the anti-resonant circuits 7, 8 of Figs. 1 and 2 are not required in Fig. 3. The capacitors 15, 16 supply the out-of-phase component of current in helix 4. The power factor sensing device 14 is connected in series with generator 1, and the potential coil of device 14 is connected across generator 1.

The mode of operation of power-factor device 14 and regulator 13 in Fig. 3 is so similar to the operation of corresponding circuit elements in Figs. 1 and 2 that no separate description thereof is considered necessary.

While I have shown and described certain specific embodiments of my invention, many modifications other than those I have illustrated are possible. My invention therefore, should not be restricted in this respect.

I claim as my invention:

1. In combination with an induction heater having a coiled conductor, the interior of which is to be occupied by a magnetic load to be heated, a source of alternating current connected to said coiled conductor to heat said load, a source of direct current connected to send current through said conductor, and means to vary the current sent by said source of direct current through said conductor in response to deviations of the power-factor of said source of alternating current from a predetermined value.

2. In combination with an induction heater having a coiled conductor, the interior of which is to be occupied by a magnetic load to be heated, a source of alternating current connected to said coiled conductor to heat said load, a source of direct current connected to send current through said conductor, and means to vary the current sent by said source of direct current through said conductor in response to deviations of the electrical quantity of said alternating current from a predetermined value.

3. In combination with an induction heater having a coiled conductor, the interior of which is to be occupied by a magnetic load to be heated, a source of alternating current connected to said coiled conductor to heat said load, a capacitance in shunt relation with said conductor, a source of direct current connected to send current through said conductor, and means to vary the current sent by said source of direct current through said conductor in response to deviations of the power-factor of said source of alternating current from a predetermined value.

4. In combination with an induction heater having a coiled conductor, the interior of which is to be occupied by a magnetic load to be heated, a source of alternating current having one terminal connected to the midpoint of said conductor and its other terminal connected to the two end-terminals of said conductor, a source of direct current connected to send current through said conductor, and means to vary the current sent by said source of direct current through said conductor in response to deviations of the power-factor of said source of alternating current from a predetermined value.

5. In combination with an induction heater having a coiled conductor, the interior of which is to be occupied by a magnetic load to be heated, a source of alternating current having one terminal connected to the midpoint of said conductor and its other terminal connected to the two end-terminals of said conductor, capacitance in shunt relation with said conductor, a source of direct current connected to send current through said conductor, and means to vary the current sent by said source of direct current through said conductor in response to deviations of the power-factor of said source of alternating current from a predetermined value.

6. In combination with an induction heater having a coiled conductor, the interior of which is to be occupied by a magnetic load to be heated, an alternating current dynamoelectric generator connected to said coiled conductor to heat said load, a capacitance in shunt relation with said conductor, a source of direct current connected to send current through said conductor, and means to vary the current sent by said source of direct current through said conductor in response to deviations from unity value of the power-factor at the terminals of said generator.

7. In combination with an induction heater having a coiled conductor, the interior of which is to be occupied by a magnetic load to be heated, an alternating current source having one terminal connected to the midpoint of said conductor and its other terminal connected to the two end-terminals of said conductor, a source of direct current connected to send current through said conductor, and means to vary the current sent by said source of direct current through said conductor in response to deviations of an electrical quantity of the circuit of said alternating current source from a predetermined value.

8. In combination with an induction heater having a coiled conductor, the interior of which is to be occupied by a magnetic load to be heated, an alternating current dynamoelectric generator connected to said coiled conductor to heat said load, a capacitance in shunt relation with said conductor, a source of direct current connected to send current through said conductor, and means to vary the current sent by said source of direct current through said conductor in response to deviations of an electrical quantity of the circuit supplied by said generator from a predetermined value.

9. In combination with an induction heater comprising a helix through which a strip of magnetic material to be heated runs, a source of alternating current connected to send current through said helix, and means including a source of direct current to vary the current sent by said source of alternating current through said helix in response to variations from a predetermined value of the power-factor at the terminals of said source of alternating current.

10. In combination with an induction heater comprising a helix through which a strip of magnetic material to be heated runs, a source of alternating current connected to send current through said helix, a source of direct current connected to send current through said helix, a capacitance connected in shunt relation with said helix, and means to vary the current sent by said source of direct current through said helix in response to variations from a predetermined value of the power-factor at the terminals of said source of alternating current.

11. In combination with an induction heater comprising a helix through which a strip of magnetic material to be heated runs, said helix having a midpoint connection, a source of alternating current having one terminal connected to the midpoint connection on said helix and its other terminal connected to both end-terminals of said helix, a source of direct current connected to send current through said helix, and means to vary the current sent by said source of direct current through said helix in response to variations from unity of the power-factor at the terminals of said source of alternating current.

12. In combination with an induction heater comprising a helix through which a strip of magnetic material to be heated runs, a source of alternating current having one terminal connected to a midpoint on said helix and its other terminal connected to both end-terminals of said helix, a source of direct current connected to said current through said helix, a capacitance connected in shunt relation with said helix, and means to vary the current sent by said source of direct current through said helix in response to variations from unity of the power-factor at the terminals of said source of alternating current.

13. In combination with an induction heater member comprising a helix through which a strip of magnetic material to be heated runs, an alternating current dynamo-electric generator connected to send currents through said helix, a source of direct current connected to send current through said helix, a capacitance in shunt relation with said helix, and means to vary the current sent by said source of direct current through said helix in response to deviations from unity of the power-factor at the terminals of said generator.

References Cited in the file of this patent

UNITED STATES PATENTS

| | | |
|---|---|---|
| 2,370,818 | Silverman | Mar. 6, 1945 |
| 2,421,786 | Haug | June 10, 1947 |
| 2,470,443 | Mittelmann | May 17, 1949 |
| 2,477,729 | FitzGerald | Aug. 2, 1949 |
| 2,498,760 | Kreithen | Feb. 28, 1950 |
| 2,524,515 | Chapman | Oct. 3, 1950 |